United States Patent
Shi et al.

(10) Patent No.: US 10,579,736 B2
(45) Date of Patent: Mar. 3, 2020

(54) METHOD AND DEVICE FOR DETERMINING COMMENT, SERVER AND STORAGE MEDIUM

(71) Applicant: BEIJING BAIDU NETCOM SCIENCE AND TECHNOLOGY CO., LTD., Beijing (CN)

(72) Inventors: Yingchao Shi, Beijing (CN); Wei He, Beijing (CN); Qiaoqiao She, Beijing (CN); Jianqing Cui, Beijing (CN); Xiangyang Zhou, Beijing (CN); Junqiang Zheng, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 120 days.

(21) Appl. No.: 15/854,918

(22) Filed: Dec. 27, 2017

(65) Prior Publication Data
US 2018/0322115 A1 Nov. 8, 2018

(30) Foreign Application Priority Data
May 8, 2017 (CN) .......................... 2017 1 0317877

(51) Int. Cl.
*G06F 17/27* (2006.01)
*G06F 17/21* (2006.01)
(Continued)

(52) U.S. Cl.
CPC ........ *G06F 17/2785* (2013.01); *G06F 17/218* (2013.01); *G06F 17/241* (2013.01);
(Continued)

(58) Field of Classification Search
CPC .............. G06F 16/9535; G06F 17/241; G06F 16/24578; G06F 16/285; G06F 16/335; G06F 16/48; G06F 16/5866; G06F 16/78; G06F 16/958; G06F 17/211; G06F 17/277; G06F 17/2785; G06F 3/0481; G06N 21/2353; G06N 21/2393; G06N 21/252; G06N 21/25866; G06N 21/84; G06Q 50/01; G06Q 30/02; G06Q 10/00; G06Q 10/10;
(Continued)

(56) References Cited

U.S. PATENT DOCUMENTS

| | | | | |
|---|---|---|---|---|
| 6,389,481 B1* | 5/2002 | Malcolm | ................... | G06F 8/73 717/140 |
| 7,500,221 B2* | 3/2009 | Baumann | ................... | G06F 8/73 715/206 |

(Continued)

*Primary Examiner* — Vijay B Chawan
(74) *Attorney, Agent, or Firm* — Hodgson Russ LLP (57) ABSTRACT

Embodiments of the present disclosure provide a method and a device for determining a comment, a server and a storage medium. The method includes: obtaining text content of an event; determining an event tag of the event according to the text content; comparing the event tag with comment tags in a comment graph, to determine candidate comments, the comment graph being generated according to other events and corresponding comments, and the comment graph including comments and corresponding comment tags; and screening the candidate comments, to determine a candidate comment satisfying a preset condition as the comment of the event.

20 Claims, 5 Drawing Sheets

(51) Int. Cl.
*G06F 17/24* (2006.01)
*G06N 20/10* (2019.01)
*G06N 7/00* (2006.01)
G06N 20/00 (2019.01)
G06F 16/951 (2019.01)
G06N 5/02 (2006.01)

(52) U.S. Cl.
CPC ........ *G06F 17/278* (2013.01); *G06F 17/2765* (2013.01); *G06F 17/2795* (2013.01); *G06N 7/005* (2013.01); *G06N 20/10* (2019.01); *G06F 16/951* (2019.01); *G06N 5/022* (2013.01); *G06N 20/00* (2019.01)

(58) Field of Classification Search
CPC ............ G06Q 30/0269; G06Q 30/0282; H04L 51/32; H04L 43/04; H04L 51/26; H04L 67/10; H04L 67/22; H04H 60/33; H04H 60/64; H04W 4/21; H04W 4/18
USPC ........ 715/230, 206, 233, 255, 748; 704/2, 9, 704/257, 235, 251, 231; 707/722, 729, 707/730, 732, 780; 717/110, 140; 719/310, 315; 725/10
See application file for complete search history.

(56) References Cited

U.S. PATENT DOCUMENTS

| | | | | |
|---|---|---|---|---|
| 7,809,548 B2 * | 10/2010 | Mihalcea | ............... | G06F 17/277 704/1 |
| 8,019,756 B2 * | 9/2011 | Murakami | ............ | G06F 16/951 707/729 |
| 8,051,074 B2 * | 11/2011 | Eom | ...................... | G06F 17/211 707/722 |
| 8,862,577 B2 * | 10/2014 | Hao | ................... | G06Q 30/0201 705/14.44 |
| 9,032,289 B1 * | 5/2015 | Cierniak | ............. | G06F 16/9558 715/255 |
| 9,043,329 B1 * | 5/2015 | Patton | ................... | G06F 16/285 707/740 |
| 9,075,785 B2 * | 7/2015 | Park | ..................... | G06F 16/955 |
| 9,401,947 B1 * | 7/2016 | Oztaskent | ............... | H04L 67/02 |
| 9,408,051 B2 * | 8/2016 | Finney | .................... | H04W 4/21 |
| 9,432,418 B1 * | 8/2016 | Mazniker | ............... | G06Q 50/01 |
| 9,442,989 B1 * | 9/2016 | Jackson | ................. | H04L 51/32 |
| 9,652,525 B2 * | 5/2017 | Patton | ................... | G06F 16/285 |
| 9,894,164 B2 * | 2/2018 | Petersen | ............... | H04W 4/021 |
| 9,894,399 B2 * | 2/2018 | Lee | ........................ | G06Q 30/02 |
| 10,319,406 B2 * | 6/2019 | Arslan | ............ | G11B 20/00123 |
| 2010/0299361 A1 * | 11/2010 | Geney | .................... | G06Q 30/02 707/780 |
| 2012/0278387 A1 * | 11/2012 | Garcia | .................. | G06Q 50/01 709/204 |
| 2013/0117771 A1 * | 5/2013 | Lee | ........................ | G06Q 30/02 725/10 |
| 2014/0011525 A1 * | 1/2014 | Zheng | ..................... | H04W 4/02 455/456.3 |
| 2014/0359008 A1 * | 12/2014 | Finney | .................... | H04W 4/21 709/204 |
| 2017/0111709 A1 * | 4/2017 | Chae | ..................... | G06F 3/0484 |

* cited by examiner

METHOD AND DEVICE FOR DETERMINING COMMENT, SERVER AND STORAGE MEDIUM

CROSS-REFERENCE TO RELATED APPLICATIONS

This application is based on and claims priority to Chinese Patent Application No. 201710317877.7, filed on May 8, 2017, the entire contents of which are incorporated herein by reference.

TECHNICAL FIELD

The present disclosure relates to computer technologies, and more particularly, to a method and a device for determining a comment, a server and a storage medium.

BACKGROUND

With the rapid development of artificial intelligence technology, it has become a hot topic in the current research that how to make a machine have the same intelligence as human. In this context, people hope that the machine can read an article, give a comment of its viewpoint, or give a general viewpoint of internet users on this article.

In the related art, comments of events (hot spots) may be indexed based on key words of the events through a conventional information retrieval technology, and a comment of a current event may be given based on the relevance among the events. The disadvantage of the solution lies in that, homogeneity of the comment is serious and the relevance is poor, the intelligence of the comment is low, and the efficiency is low.

SUMMARY

Embodiments of the present disclosure provide a method for determining a comment. The method includes: obtaining text content of an event; determining an event tag of the event according to the text content; comparing the event tag with comment tags in a comment graph, to determine candidate comments, the comment graph being generated according to other events and corresponding comments, and the comment graph including comments and corresponding comment tags; and screening the candidate comments, to determine a candidate comment satisfying a preset condition as the comment of the event.

Embodiments of the present disclosure provide a server. The server includes one or more processors and a storage device. The storage device is configured to store one or more programs. When the one or more programs are executed by the one or more processors, the one or more processors are caused to implement the aforementioned method for determining a comment.

Embodiments of the present disclosure provide a storage medium including computer executable instructions. When the computer executable instructions are executed by a computer processor, the aforementioned method for determining a comment is executed.

BRIEF DESCRIPTION OF THE DRAWINGS

Other features, objectives and advantages of the present disclosure will become apparent from detailed descriptions of non-restrictive embodiments made with reference to the drawings, in which.

DETAILED DESCRIPTION

Figure 1A:
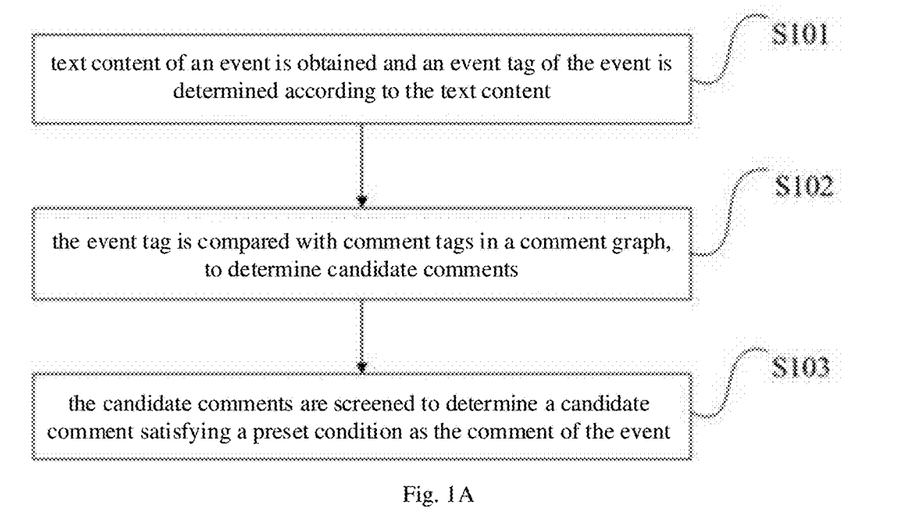
FIG. 1A is a flow chart of a method for determining a comment according to an embodiment of the present disclosure.

Reference will be made in detail to the present disclosure with the accompanying drawings and embodiments. It should be understood that, the specific embodiments described herein are only used to explain the present disclosure and rather than to limit the present disclosure. In addition, it should be noted that, for the convenience of description, only some but not all structures related to the present disclosure are illustrated in the accompanying drawings FIG. 1A is a flow chart of a method for determining a comment according to an embodiment of the present disclosure. The present embodiment may be applied in a case of automatically commenting on the event, and the method may be performed by a computer device such as a server. As illustrated in FIG. 1A, the solutions provided by the present embodiments include follows.

At block S101, text content of an event is obtained and an event tag of the event is determined according to the text content.

In an embodiment, the event may be a news, an article of a WeChat public account, a microblog, a blog etc. The text content of the event is a literal content of the event. The literal content or the text content may be a description of a specific news, a description of a star or a person, or a record or a description of a place (such as a scenic spot), which is not limited in the present disclosure. In the solution of the present disclosure, the comment may be automatically generated to comment on the event. For example, Zhang San (a person name) publishes an entertainment gossip article about Zhao Liying (a Chinese actress) through a WeChat public account, and then the comment for this gossip article can be automatically formed with the solution of the present disclosure. In detail, a web page of the entertainment gossip article published by Zhang San can be crawled through a web crawler, and the text content of this event (i.e., this gossip article) can be determined according to content of the obtained web page.

The event tag characterizes a reported object, a location and an occurrence of the event. For example, the event is a web news, the uniform resource locator (URL) of the web news is: http://news.youth.cn/jsxw/201702/t20170224_9165047.htm, the main content of the web news is an old age make-up photo published by Zhao Liying, and the event tag of the event may be determined as "Zhao Liying", "Publish", "Old age make-up" and "Photo".

In an embodiment, the process of determining the event tag of the event according to the text content may include follows.

Firstly, pre-processing is performed on the text content to obtain a word set corresponding to the text content. For example, a natural language represented by the text content is divided into separate words by performing recognition and division on the text content based on semantic and grammar. For example, the text content of the event reads as "Sohu entertainment news at 23 evening, Zhao Liying publishes an old age make-up photo of herself. In the photo, Zhao Liying has gray and curly hair, wears a pair of glasses, wears a cardigan, and hunched. Zhao Liying writes: I hope to be old with you. I may have changed my fate, because you are back. Years may not leave a beautiful face, but it is good to be old with loved one." Accordingly, the obtained word set may be "Sohu, Entertainment, Zhao Liying, Publish, Old age make-up, Photo . . . ."

After the word set corresponding to the text content of the event is determined, weight values of words in the word set are determined according to a preset learning model, and a word corresponding to a weight value satisfying a condition is determined as the event tag of the event. In detail, the preset learning model is obtained through support vector machine (SVM) by learning and training multiple feature dimensions such as the number of occurrences and location of the word in the word set, whether it is a professional noun, whether it appears in a title, etc. The preset learning model may be learned in advance. When it is needed to determine the event tag of the event, the preset learning model can be used to determine the weight values of the words in the obtained word set. For example, in the word set, the word "Zhao Liying" appears three times and appears in the title of the event, and then the weight value of the word "Zhao Liying" is the highest; the word "photo" appears twice and also appears in the title of the event, and then the weight value of the word "photo" is also higher; and the word "Sohu" appears once, the frequency is low, and it does not in the title, and then the weight value of the word "Sohu" is low. The event tag may be determined according to the determined weight values of the words. In detail, the words are sorted from high to low according to the weight values, and an appropriate percentage rate is selected according to the number of words in the word set and the number of the event tag to be obtained, to determine the words that rank high as the event tag.

At block S102, the event tag is compared with comment tags in a comment graph, to determine candidate comments.

Figure 1B:
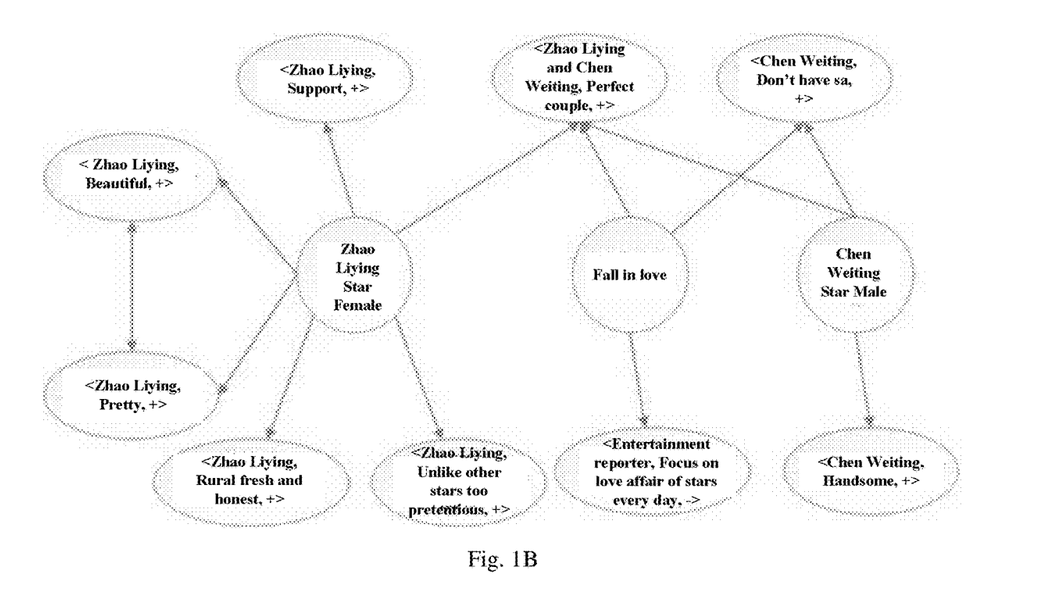
FIG. 1B is a schematic diagram of a comment graph used in a method for determining a comment according to an embodiment of the present disclosure.

In an embodiment, the comment graph is generated by other events and corresponding comments, and the comment graph includes comments and corresponding comment tags. FIG. 1B is a schematic diagram of a comment graph used in a method for determining a comment according to an embodiment of the present disclosure. As illustrated in FIG. 1B, the comment graph includes nodes and edges. The node of the comment graph may be a comment node or a tag node. The content stored in the comment node is the specific comment, such as "<Zhao Liying, Beautiful, +>", "<Zhao Liying, Support, +>", "<Entertainment reporter, Focus on love affair of stars every day, −>". In the comment node, "+" represents that the comment is positive, that is, the comment that characterizes positive emotions, while "−" represents negative and critical comment. Another node in the comment graph such as "Zhao Liying Star Female" and "Chen Weiting Star Male" is the tag node. The content stored in the tag node is the comment tag, and the comment tag is determined by the comment and the event corresponding to the comment.

In an embodiment, the determined event tag is compared with the comment tags in the comment graph, to determine the candidate comments according to the comparison result. For the convenience of explanation, the comparison of tags in the process of determining the candidate comments is simplified. For example, when the determined event tag is "Zhao Liying", correspondingly, the comment tag including "Zhao Liying" in the comment graph is found, and the comment "Zhao Liying, Beautiful" that the comment tag points to is determined as the candidate comment.

In an embodiment, the determined event tag is compared with the comment tags corresponding to the comments in the comment graph, and the comments are sorted from high to low according to the number of the event tags hit by the comment tags, to determine the comments that rank high as the candidate comments.

For example, the event tag of the determined event is "Zhao Liying Publish Photo", and then the candidate comment obtained by the comment graph may be as follows (the comments that rank high after the comments are sorted from high to low according to the number of event tags hit by the comment tags are displayed).

a) Everything looks good, Xiao Gu (the name of a role Zhao Liying once played) is beautiful (the comment tag of the candidate comment is Zhao Liying Publish Photo).

b) Still a big eye (the comment tag of the candidate comment is Zhao Liying Publish Photo).

c) Zhao Liying is really beautiful (the comment tag of the candidate comment is Zhao Liying Photo).

The number of the event tags hit by the candidate comment a, b and c are 3, 3 and 2.

At block S103, the candidate comments are screened to determine a candidate comment satisfying a preset condition as the comment of the event.

In an embodiment, the preset condition may refer to that the comment tag corresponding to the comment is a subset of the event tag, and the more event tag hit by the comment tag, the better the comment of the comment tag as the comment of the event. Once the event tag does not cover the comment, i.e., there is a tag in the comment tag that does not exist in the event tag, the comment is easy to deviate from a main line of comment, so the above preset condition is adopted.

Taking the example at block S102 as an example, the final comments may be "everything looks good, Xiao Gu is beautiful", and "still a big eye".

With the method for determining the comment provided in the present embodiment, the event is automatically commented on by using the comment graph obtained by big data mining, the comment tag in the comment graph is obtained by the comment and the event corresponding to the comment, instead of simple extracting key words based on the comment and comparing with the event tag to obtain the comment, so that the relevance between the comment and the event is enhanced, and it is more intelligent and high-efficient to determine the comment.

Figure 2:
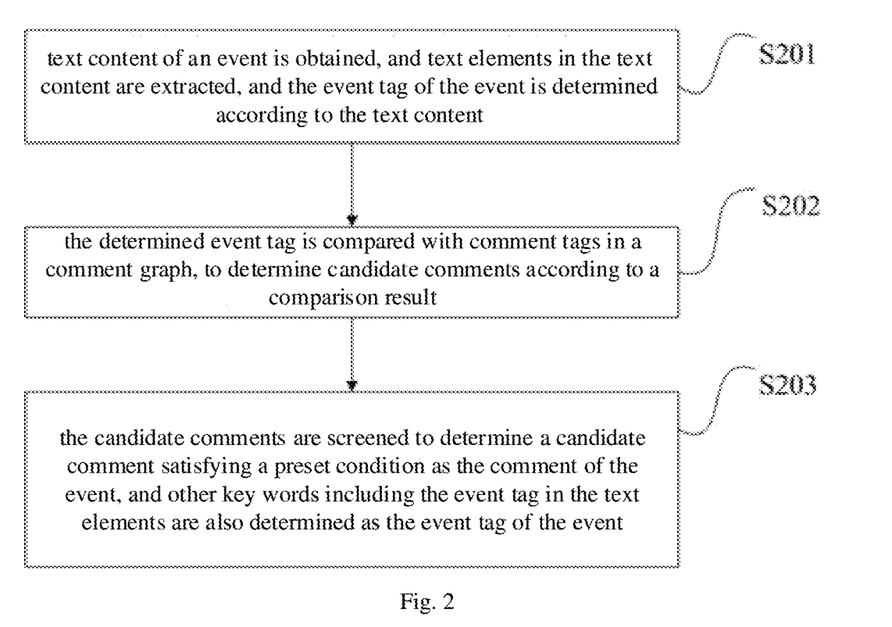
FIG. 2 is a flow chart of a method for determining a comment according to another embodiment of the present disclosure.

FIG. 2 is a flow chart of a method for determining a comment according to another embodiment of the present disclosure. On the basis of the above embodiments, in at least one embodiment, before pre-processing the text content, the method further includes extracting text elements in the text content.

Accordingly, after determining the word corresponding to the weight value satisfying the condition as the event tag of the event, the method further includes: determining other key words including the event tag in the text elements as the event tag of the event.

Thus, the integrity of the determined event tag is enhanced, and the scene of the event is more conformed.

Based on the above optimization, as illustrated in FIG. 2, the technical solutions provided in this embodiment may include follows.

At block S201, text content of an event is obtained, and text elements in the text content are extracted, and the event tag of the event is determined according to the text content.

The text elements may be extracted from the text content in an event extraction manner. The event may be described as an occurrence of an action or a change of a state. The event itself includes an event type and event elements. In the automatic content extraction (ACE) conference, 8 event categories and 33 event subcategories are defined.

In detail, for example, assuming the text content is that "Zhao Liying and Chen Weiting fall in love, and love details of Zhao Liying and Chen Weitian are exposed", the text elements may be determined as "Fall in love, Zhao Liying, Chen Weiting, None, None" through an event extraction program and algorithm. Each individual word in the text elements may be identified as a key word.

At block S202, the determined event tag is compared with comment tags in a comment graph, to determine candidate comments according to a comparison result.

At block S203, the candidate comments are screened to determine a candidate comment satisfying a preset condition as the comment of the event, and other key words including the event tag in the text elements are also determined as the event tag of the event.

For example, when the determined event tag is "Zhao Liying Chen Weiting", the text elements determined at block S201 may be "Fall in love, Zhao Liying, Chen Weiting, None, None", and the key word "Fall in love" that is not determined as the event tag in the text elements is also determined as the event tag.

With the method for determining the comment provided in the present embodiment, in the process of determining the event tag, the event extraction is performed on the text content of the event to obtain the text elements. When the key word in the text elements is hit by the determined event tag, other key words in the text elements may be also determined as the event tag, so that the integrity of the determined event tags is improved, and the relevance of a subsequent comment is further improved.

Figure 3:
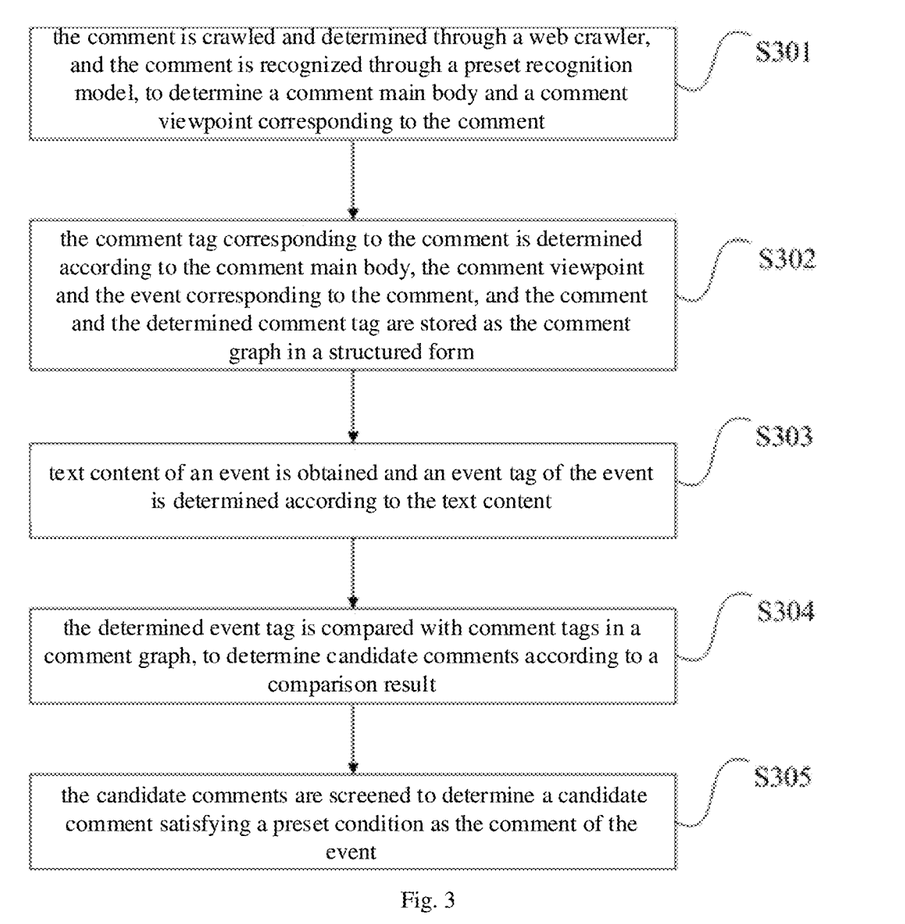
FIG. 3 is a flow chart of a method for determining a comment according to another embodiment of the present disclosure.

FIG. 3 is a flow chart of a method for determining a comment according to another embodiment of the present disclosure. On the basis of the above embodiments, in at least one embodiment, the process of generating the comment graph by other events and corresponding comments includes: crawling and determining the comment through a web crawler; recognizing the comment through a preset recognition model, to determine a comment main body and a comment viewpoint corresponding to the comment; determining the comment tag corresponding to the comment according to the comment main body, the comment viewpoint and the event corresponding to the comment; storing the comment and the determined comment tag as the comment graph in a structured form.

Based on the above optimization, as illustrated in FIG. 3, the technical solutions provided in embodiment may include follows.

At block S301, the comment is crawled and determined through a web crawler, and the comment is recognized through a preset recognition model, to determine a comment main body and a comment viewpoint corresponding to the comment.

In an embodiment, the way of crawling and determining the comment may be as follows. Texts with emotional tendency are mined from a mass of internet pages, microblogs and UGC (User Generated Content) sources, and by using the web crawler, website data that potentially have comment data such as web pages of comment type, news comments, BBS and microblogs are directionally crawled, the content of the web pages is extracted and divided, to generate the potential comments, and finally by using an emotional tendency analysis technology, sentences with emotional tendency are selected to be determined as the comments.

In an embodiment, the preset recognition model may be a crf model (an undirected graph model, which works well in sequence labeling tasks such as word segmentation, part-of-speech tagging and named entity recognition). By using the crf model to recognize the comment, the comment main body and the comment viewpoint corresponding to the comment is determined. For example, the comment is "Journey to the West: The Demons Strike Back, pretty good!", and then the comment main body is determined as "Journey to the West: The Demons Strike Back", and the comment viewpoint is "pretty good". For another example, the comment is "I like Jay Chou", and then by the crf model, the comment main body is determined as "Jay Chou", and the comment viewpoint is "I like".

At block S302, the comment tag corresponding to the comment is determined according to the comment main body, the comment viewpoint and the event corresponding to the comment, and the comment and the determined comment tag are stored as the comment graph in a structured form.

In an embodiment, the comment tag is a set of words that constrains a comment environment of the comment, and the comment tag is closely related to the event in the determining process. In detail, the event tag of the event is determined first, and the determination manner is as described at block S101, which is not described herein again. After the event tag is determined, the comment tag is finally determined according to the comment main body, the comment viewpoint and the event tag. The strategy for determining the comment tag includes: direct matching a synonym dictionary, synonymous aligning proper names based on a rule, or screening based on a similarity between content words in the comments and the event tags. The specific form of the comment graph can refer to descriptions at block S102, which is not described herein again.

At block S303, text content of an event is obtained and an event tag of the event is determined according to the text content.

At block S304, the determined event tag is compared with comment tags in a comment graph, to determine candidate comments according to a comparison result.

At block S305, the candidate comments are screened to determine a candidate comment satisfying a preset condition as the comment of the event.

With the method for determining the comment provided in the present embodiment, the comment is crawled directionally and determined through the web crawler, and the comment is recognized through the preset recognition model to determine the comment main body and the comment viewpoint corresponding to the comment, the comment tag corresponding to the comment is determined according to the comment main body, the comment viewpoint and the event corresponding to the comment, and the comment and the determined comment tag are stored as the comment graph in the structured form, such that the relevance between the comment and the event is enhanced, and it is more intelligent and high-efficient to determine the comment.

Figure 4:
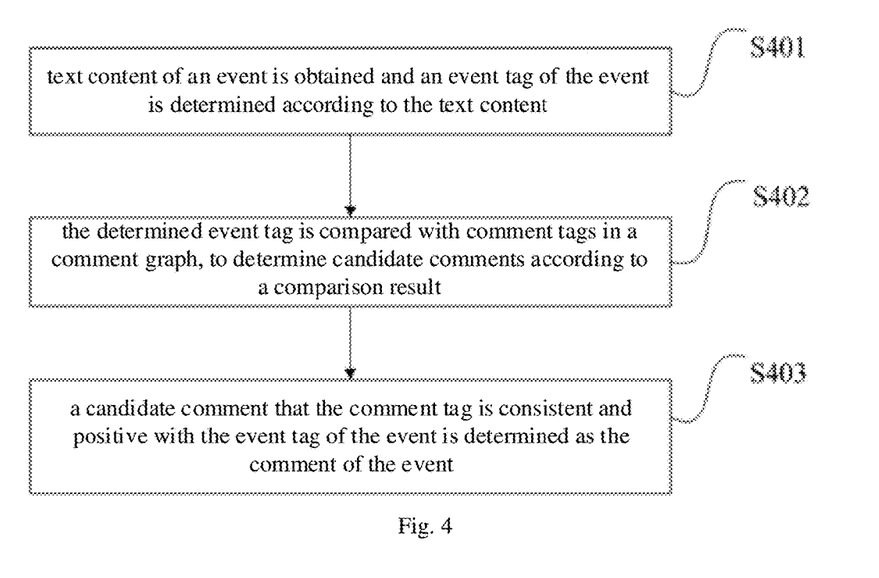
FIG. 4 is a flow chart of a method for determining a comment according to another embodiment of the present disclosure.

FIG. 4 is a flow chart of a method for determining a comment according to an embodiment of the present disclosure. On the basis of the above embodiments, in at least on embodiment, the act of screening the candidate comments, to determine the candidate comment satisfying the preset condition as the comment of the event includes: determining a candidate comment that the comment tag is consistent and positive with the event tag of the event as the comment of the event.

Thus, the relevance between the comment and the event is further improved.

Based on the above optimization, as illustrated in FIG. 4, the technical solutions provided in this embodiment may include follows.

At block S401, text content of an event is obtained and an event tag of the event is determined according to the text content.

At block S402, the determined event tag is compared with comment tags in a comment graph, to determine candidate comments according to a comparison result.

At block S403, a candidate comment that the comment tag is consistent and positive with the event tag of the event is determined as the comment of the event.

For example, the event tag of the determined event is "Zhao Liying Publish Photo", and then the candidate comments obtained by the comment graph may be as follows.

a) Everything looks good, Xiao Gu is beautiful (the comment tag of the candidate comment is Zhao Liying Publish Photo).

b) Still a big eye (the comment tag of the candidate comment is Zhao Liying Publish Photo).

c) There is little before and after the picture is beautified (the comment tag of the candidate comment is Zhao Liying Publish Beauty Before and after comparison Photo).

d) Zhao Liying is really beautiful (the comment tag of the candidate comment is Zhao Liying Photo).

Although the comment tag in the candidate comment c also hit all the event tag, the comment tag includes contents such as "Beauty Before and after comparison", and the relevance between the candidate comment and the event is poor, thereby excluding c as the final comment.

After training and learning a large number of sentences, a machine has the ability to judge whether a sentence is positive or negative. In this embodiment, the positive candidate comment is selected as the final comment, and negative candidate comments or candidate comments without emotional tendency may also be selected as the comment according to needs of different users and enterprises.

With the method for determining the comment provided in the present embodiment, the candidate comment that the comment tag is consistent and positive with the event tag of the event is determined as the comment of the event, the relevance between the comment and the event is further improved, and the emotional tendency of the comment can be determined by human selection.

Based on the foregoing technical solutions, the event includes a news. Correspondingly, after the candidate comment satisfying the preset condition is determined as the comment of the event, the method further includes: determining an emotional logic of the news, and commenting on the news by selecting qualified comment based on the emotional logic. In the present solution, the emotional logic of the news may be positive (positive and publicized) logic, and may also be negative (critical) logic, and in the process of determining the comment, the determined comment is more instructive by considering whether positive and negative aspects of the comment are consistent with the emotional logic of the news.

Figure 5:
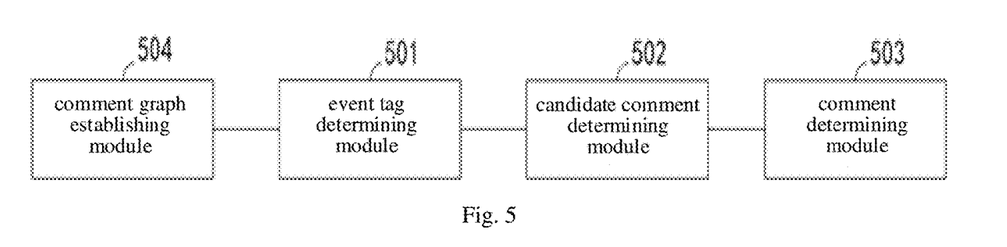
FIG. 5 is a block diagram of a device for determining a comment according to an embodiment of the present disclosure.

FIG. 5 is a block diagram of a device for determining a comment according to an embodiment of the present disclosure. The device is configured to perform the method for determining a comment provided by the above embodiments, includes corresponding modules configured to perform the method and has beneficial effects. As illustrated in FIG. 5, the device includes an event tag determining module 501, a candidate comment determining module 502 and a comment determining module 503.

The event tag determining module 501 is configured to obtain text content of an event and to determine an event tag of the event according to the text content.

The candidate comment determining module 502 is configured to compare the event tag with comment tags in a comment graph, to determine candidate comments, the comment graph being generated according to other events and corresponding comments, and the comment graph comprising comments and corresponding comment tags.

The comment determining module 503 is configured to screen the candidate comments, to determine a candidate comment satisfying a preset condition as the comment of the event.

With the device provided by embodiments of the present disclosure, by obtaining the text content of the event, determining the event tag of the event according to the text content, comparing the determined event tag with the comment tags in the comment graph to determine the candidate comments according to the comparison result, and obtaining the comment from the candidate comments to comment on the event, the relevance between the comment and the event is enhanced, and it is more intelligent and high-efficient to determine the comment.

Based on the above technical solutions, the event tag determining module 501 is configured to: pre-process the text content, to obtain a word set corresponding to the text content, the word set including at least two words; determine weight values of words in the word set according to a preset learning model; and determine a word corresponding to a weight value satisfying a condition as the event tag of the event.

Based on the above technical solutions, the event tag determining module 501 is further configured to: before pre-processing the text content, extract text elements in the text content, the text element including at least two key words; and after determining the word corresponding to the weight value satisfying the condition as the event tag of the event, determine other key words including the event tag in the text elements as the event tag of the event.

Based on the above technical solutions, the candidate comment determining module 502 is configured to: compare the event tag with the comment tags corresponding to the comments in the comment graph, and sort the comments from high to low according to the number of the event tags hit by the comment tags, to determine comments that rank high as the candidate comments.

Based on the above technical solutions, the comment determining module 503 is configured to determine a candidate comment that the comment tag is consistent and positive with the event tag of the event as the comment of the event.

Based on the above technical solutions, the event includes a news. The comment determining module 503 is further configured to determine an emotional logic of the news, and to comment on the news by selecting qualified comment based on the emotional logic after determining the candidate comment satisfying the preset condition as the comment of the event.

Based on the above technical solutions, the device further includes a comment graph establishing module 504.

The comment graph establishing module 504 is configured to: crawl and determine the comment through a web crawler; recognize the comment through a preset recognition model, to determine a comment main body and a comment viewpoint corresponding to the comment; determine the comment tag corresponding to the comment according to the comment main body, the comment viewpoint and the event corresponding to the comment; and store the comment and the determined comment tag as the comment graph in a structured form.

Figure 6:
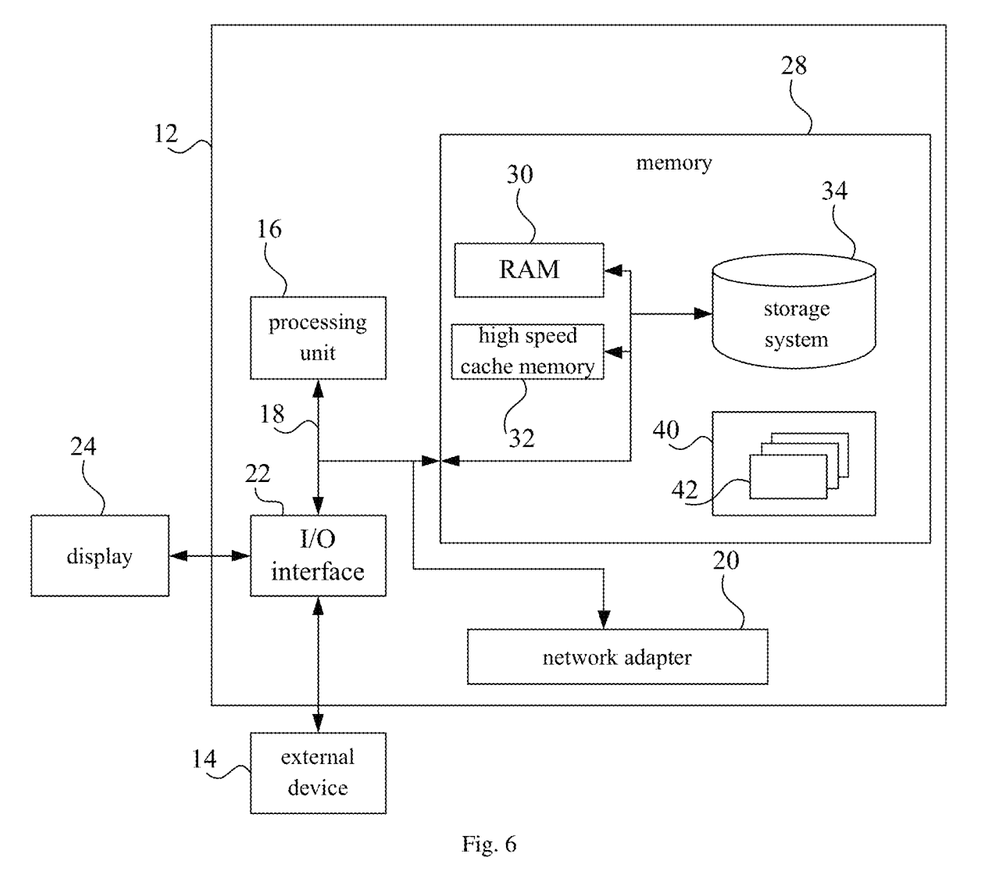
FIG. 6 is a block diagram of a server according to an embodiment of the present disclosure.

FIG. 6 is a block diagram illustrating a server according to an embodiment of the present disclosure. FIG. 6 illustrates a block diagram of an exemplary server 12 suitable for realizing implementations of the present disclosure. The server 12 illustrated in FIG. 6 is merely an example, which should be not understood to limit the functions and usage scope of embodiments of the present disclosure.

As illustrated in FIG. 6, the server 12 may be represented via a general computer device form. Components of the server 12 may include but be not limited to one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The server 12 typically includes a variety of computer system readable media. These media may be any available media accessible by the server 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The server 12 may further include other removable or non-removable, volatile or non-volatile computer system storage media. By way of example only, the storage system 34 may be configured to read and write a non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product.

The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The server 12 may also communicate with one or more external devices 14 (such as, a keyboard, a pointing device, a display 24, etc.). Furthermore, the server 12 may also communicate with one or more communication devices enabling a user to interact with the server 12 and/or other devices (such as a network card, modem, etc.) enabling the server 12 to communicate with one or more computer devices. This communication can be performed via the input/output (I/O) interface 22. Also, the server 12 may communicate with one or more networks (such as a local area network (hereafter referred to as LAN), a wide area network (hereafter referred to as WAN) and/or a public network such as an Internet) through a network adapter 20. As shown in FIG. 6, the network adapter 20 communicates with other modules of the server 12 over the bus 18. It should be understood that, although not shown in FIG. 6, other hardware and/or software modules may be used in connection with the server 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method for determining a comment provided in embodiments of the present disclosure.

Embodiments of the present disclosure further provide a storage medium including computer executable instructions. When the computer executable instructions are executed by a computer processor, a method for determining a comment provided in embodiments of the present disclosure is executed.

The method includes: obtaining text content of an event; determining an event tag of the event according to the text content; comparing the event tag with comment tags in a comment graph, to determine candidate comments, the comment graph being generated according to other events and corresponding comments, and the comment graph including comments and corresponding comment tags; and screening the candidate comments, to determine a candidate comment satisfying a preset condition as the comment of the event.

In at least one embodiment, determining the event tag of the event according to the text content includes: pre-processing the text content, to obtain a word set corresponding to the text content, the word set including at least two words; determining weight values of words in the word set according to a preset learning model; and determining a word corresponding to a weight value satisfying a condition as the event tag of the event.

In at least one embodiment, before pre-processing the text content, the method further includes extracting text elements in the text content, the text element including at least two key words.

Accordingly, after determining the word corresponding to the weight value satisfying the condition as the event tag of the event, the method further includes determining other key words including the event tag in the text elements as the event tag of the event.

In at least one embodiment, comparing the event tag with the comment tags in the comment graph, to determine the candidate comments includes: comparing the event tag with the comment tags corresponding to the comments in the comment graph, and sorting the comments from high to low according to the number of the event tags hit by the comment tags, to determine comments that rank high as the candidate comments.

In at least one embodiment, screening the candidate comments, to determine the candidate comment satisfying the preset condition as the comment of the event includes: determining a candidate comment that the comment tag is consistent and positive with the event tag of the event as the comment of the event.

In at least one embodiment, the event includes a news. Accordingly, after determining the candidate comment satisfying the preset condition as the comment of the event, the method further includes: determining an emotional logic of the news, and commenting on the news by selecting qualified comment based on the emotional logic.

In at least one embodiment, a process of generating the comment graph by other events and corresponding comments includes: crawling and determining the comment through a web crawler; recognizing the comment through a preset recognition model, to determine a comment main body and a comment viewpoint corresponding to the comment; determining the comment tag corresponding to the comment according to the comment main body, the comment viewpoint and the event corresponding to the comment; and storing the comment and the determined comment tag as the comment graph in a structured form.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for determining a comment, comprising:
obtaining text content of an event;
determining an event tag of the event according to the text content;
comparing the event tag with comment tags in a comment graph, to determine candidate comments, the comment graph being generated according to other events and corresponding comments, and the comment graph comprising comments and corresponding comment tags; and
screening the candidate comments, to determine a candidate comment satisfying a preset condition as the comment of the event.

2. The method according to claim 1, wherein determining the event tag of the event according to the text content comprises:
pre-processing the text content, to obtain a word set corresponding to the text content, the word set comprising at least two words;
determining weight values of words in the word set according to a preset learning model; and
determining a word corresponding to a weight value satisfying a condition as the event tag of the event.

3. The method according to claim 2, before pre-processing the text content, further comprising:
extracting text elements in the text content, the text element comprising at least two key words;

accordingly, after determining the word corresponding to the weight value satisfying the condition as the event tag of the event, further comprising:

determining other key words comprising the event tag in the text elements as the event tag of the event.

4. The method according to claim 1, wherein comparing the event tag with the comment tags in the comment graph, to determine the candidate comments comprises:

comparing the event tag with the comment tags corresponding to the comments in the comment graph, and sorting the comments from high to low according to the number of the event tags hit by the comment tags, to determine comments that rank high as the candidate comments.

5. The method according to claim 4, wherein screening the candidate comments, to determine the candidate comment satisfying the preset condition as the comment of the event comprises:

determining a candidate comment that the comment tag is consistent and positive with the event tag of the event as the comment of the event.

6. The method according to claim 4, wherein, the event comprises a news, accordingly, after determining the candidate comment satisfying the preset condition as the comment of the event, the method further comprises:

determining an emotional logic of the news, and commenting on the news by selecting qualified comment based on the emotional logic.

7. The method according to claim 1, wherein a process of generating the comment graph by other events and corresponding comments comprises:

crawling and determining the comment through a web crawler;

recognizing the comment through a preset recognition model, to determine a comment main body and a comment viewpoint corresponding to the comment;

determining the comment tag corresponding to the comment according to the comment main body, the comment viewpoint and the event corresponding to the comment; and storing the comment and the determined comment tag as the comment graph in a structured form.

8. A server, comprising:
one or more processors;
a storage device, configured to store one or more programs;
wherein when the one or more programs are executed by the one or more processors, the one or more processors are configured to be caused to implement acts of:
obtaining text content of an event;
determining an event tag of the event according to the text content;
comparing the event tag with comment tags in a comment graph, to determine candidate comments, the comment graph being generated according to other events and corresponding comments, and the comment graph comprising comments and corresponding comment tags; and
screening the candidate comments, to determine a candidate comment satisfying a preset condition as the comment of the event.

9. The server according to claim 8, wherein the one or more processors are configured to determine the event tag of the event according to the text content by acts of:

pre-processing the text content, to obtain a word set corresponding to the text content, the word set comprising at least two words;

determining weight values of words in the word set according to a preset learning model; and determining a word corresponding to a weight value satisfying a condition as the event tag of the event.

10. The server according to claim 9, wherein the one or more processors are further configured to implement acts of:

before pre-processing the text content, extracting text elements in the text content, the text element comprising at least two key words;

accordingly, after determining the word corresponding to the weight value satisfying the condition as the event tag of the event, determining other key words comprising the event tag in the text elements as the event tag of the event.

11. The server according to claim 8, wherein the one or more processors are configured to compare the event tag with the comment tags in the comment graph, to determine the candidate comments by acts of:

comparing the event tag with the comment tags corresponding to the comments in the comment graph, and sorting the comments from high to low according to the number of the event tags hit by the comment tags, to determine comments that rank high as the candidate comments.

12. The server according to claim 11, wherein the one or more processors are configured to screen the candidate comments, to determine the candidate comment satisfying the preset condition as the comment of the event by acts of:

determining a candidate comment that the comment tag is consistent and positive with the event tag of the event as the comment of the event.

13. The server according to claim 11, wherein the event comprises a news, accordingly, the one or more processors are further configured to implement acts of:

after determining the candidate comment satisfying the preset condition as the comment of the event, determining an emotional logic of the news, and commenting on the news by selecting qualified comment based on the emotional logic.

14. The server according to claim 8, wherein the one or more processors are further configured to implement acts of:

crawling and determining the comment through a web crawler;

recognizing the comment through a preset recognition model, to determine a comment main body and a comment viewpoint corresponding to the comment;

determining the comment tag corresponding to the comment according to the comment main body, the comment viewpoint and the event corresponding to the comment; and storing the comment and the determined comment tag as the comment graph in a structured form.

15. A non-transitory computer readable storage medium comprising computer executable instructions, wherein when the computer executable instructions are executed by a computer processor, a method for determining comment is executed, the method comprises:

obtaining text content of an event;

determining an event tag of the event according to the text content;

comparing the event tag with comment tags in a comment graph, to determine candidate comments, the comment graph being generated according to other events and corresponding comments, and the comment graph comprising comments and corresponding comment tags; and screening the candidate comments, to determine a candidate comment satisfying a preset condition as the comment of the event.

16. The non-transitory computer readable storage medium according to claim 15, wherein determining the event tag of the event according to the text content comprises:
pre-processing the text content, to obtain a word set corresponding to the text content, the word set comprising at least two words;
determining weight values of words in the word set according to a preset learning model; and
determining a word corresponding to a weight value satisfying a condition as the event tag of the event.

17. The non-transitory computer readable storage medium according to claim 16, before pre-processing the text content, the method further comprises:
extracting text elements in the text content, the text element comprising at least two key words;
accordingly, after determining the word corresponding to the weight value satisfying the condition as the event tag of the event, further comprising:
determining other key words comprising the event tag in the text elements as the event tag of the event.

18. The non-transitory computer readable storage medium according to claim 15, wherein comparing the event tag with the comment tags in the comment graph, to determine the candidate comments comprises:
comparing the event tag with the comment tags corresponding to the comments in the comment graph, and sorting the comments from high to low according to the number of the event tags hit by the comment tags, to determine comments that rank high as the candidate comments.

19. The non-transitory computer readable storage medium according to claim 18, wherein screening the candidate comments, to determine the candidate comment satisfying the preset condition as the comment of the event comprises:
determining a candidate comment that the comment tag is consistent and positive with the event tag of the event as the comment of the event.

20. The non-transitory computer readable storage medium according to claim 18, wherein, the event comprises a news, accordingly, after determining the candidate comment satisfying the preset condition as the comment of the event, the method further comprises:
determining an emotional logic of the news, and commenting on the news by selecting qualified comment based on the emotional logic.

* * * * *